UNITED STATES PATENT OFFICE 1,960,251

COATING COMPOSITION

John Mano, Flushing, N. Y., assignor to Hosnoler Corporation, New York, N. Y., a corporation of New York No Drawing. Application January 6, 1930, Serial No. 418,993

10 Claims. (Cl. 134—17)

This invention relates to coating compositions and is particularly useful as a durable, anti-corrosive, anti-fouling, water-proof, water-repellant, acid-fume resisting and rust-proofing paint for marine and other purposes.

One of the principal ingredients of my improved composition is a gum which has been heretofore unknown and which has been named "Lincman" gum.

Lincman gum is a coined name for *Euphorbia lactea*, or the milky exudate of the plant native to Santo Domingo and identified by the specialists of the United States Department of Agriculture, Bureau of Plant Industry, early in the year 1929, as *Euphorbia lactea*, and is called by the natives "Raquetta", and is also known as *Euphorbia antiquorum*. It is identified and described by Nathaniel Lord Britton in his work entitled "Flora of Bermuda", published by Charles Scribner & Sons, New York, in 1918, on page 219, as follows: "*Euphorbia lactea haw*; mottled candlestick tree, East Indian, a fleshy nearly leafless plant 6'-12' high, the spreading 3-angled branches whitish or yellowish-blotched, knobby, with a short double spine on the end of each knob, is grown for interest in many gardens. Its copious sap is bright white". The exudate from this cactus plant is freed from foreign material and coagulated.

The resulting product is a slightly grayish, firm, putty-like, though tough mass. It is insoluble in water, partly soluble in alcohol, acetone, and ether. It is entirely soluble in benzol and its homologues, carbon tetrachloride, chloroform, carbon disulphide, or mixtures thereof.

I have found that after the gum had been allowed to stand for some length of time in alcohol, and the insoluble portion then removed by filtration, after which the alcohol is evaporated, it yielded, when dried, a transparent, glossy, smooth to the touch, faintly brownish residium of amorphous nature which can be scaled and powdered and in the nature of a resin. This extracted resin contains substances extremely bitter to the tongue, lips and throat, giving when tasted, an increasing sense of warmth. It is peppery, burning and smarting to the taste, much similar to capsicum. The sensation lasts for several hours, from which I conclude that the gum contains a substantial proportion of bitter principles.

It is probably for that reason that cattle do not eat it and that it is used by the natives as a hedge for fencing out goats, hogs and cattle. Lincman gum further contains, besides resin and bitter principles, a substantial amount of a colloid in the nature of rubber. I include such an exudate in my new composition to enable it to yield sufficiently under stress to resist the wearing action and friction of sea water under motion. The property of elasticity and yielding under action which would quickly destroy other paints may be aided by the other ingredients, as will be pointed out hereinafter, so that my composition is not removed by the friction of the water, as when it breaks against walls, peers, piling, under-sea machinery or construction and the like, coated thereby; nor is my improved paint likely to be rubbed or washed off for long periods when used in ship bottoms, buoys, and sea-plane pontoons.

To utilize Lincman gum in my improved composition, I prefer to pulverize the gum after the foreign matter has been removed therefrom.

For aiding to impart elasticity to my new composition and to further impart its peculiar water-absorbent and water-repellant properties thereto, so that my composition may be used in damp or wet places, or where exposed to the action of sea water, I prefer to work into about 25 parts by weight of the gum, about five to ten parts of cholesterin together with about the same proportion of a vehicle for the cholesterin.

The cholesterin, as I believe, imparts to the composition the property of indefinitely resisting oxidation, thereby acting as a preservative. It prevents the composition from drying out too hard, thereby retaining its elasticity indefinitely. It absorbs a definite percentage of water, which it distributes on sub-division throughout the composition, and after absorbing its water content, then repels moisture.

The cholesterin keeps the composition sufficiently moist to prevent loss of elasticity and prevents the composition from becoming brittle. It aids in holding added pigments in emulsion, and assists in the emulsification of the vehicle for the cholesterin with the moisture content of the composition. It also permits of the addition of water, if necessary, especially if water soluble toxics are to be used.

The vehicle for the cholesterin may be any mineral, animal or vegetable fat, oil or wax in which the cholesterin is soluble. The available oils include vegetable drying oils such as linseed oil, soya bean oil, tung oil, or fish oils such as sperm oil, menhaden oil, spermaceti, or animal fats such as tallow and lanolin or fatty acids such as stearic, oleic or palmitic acids, or waxes such as beeswax, canauba wax and japan wax, or hydrogenated, blown or sulphonated oils. The vehicle for the cholesterin will be hereinafter referred to as a "fat".

Since cholesterin mixes easily with any fat, oil or wax, I can readily emulsify the cholesterin with the fat and then work it into the lincman gum, together with a pigment, if desired.

The cholesterin may be added to the fatty substance, or may be introduced into the composition in the natural form of an animal fat rich in cholesterin. In any case, I have found that the cholesterin serves as an emulsifying agent not only for the fatty substance, but also for the pigments which may be added to give body and color to the composition, or as a vehicle for the cholesterin. The emulsification is carried out quite well even in the presence of water, since I believe that the cholesterin after absorbing its limit of moisture, then repels water.

For the use of my composition as an anti-fouling paint, I prefer to add a small percentage of a toxic. The toxic may be any such as have been heretofore known in anti-fouling paints.

I prefer, however, to use such toxics as are water soluble, for the reason that the emulsion formed by the cholesterin vehicle and water absorbed by the composition becomes more readily impregnated with the toxic, and is absorbed by the marine life which attempts to adhere to the surface coated with my composition. The composition being somewhat yieldable and elastic, the toxic is not permanently bound therein, but is available at the surface at all times for absorption by marine life. As examples of suitable toxics, I may mention metallic toxics such as mercury, copper and arsenic compounds, cyanide compounds, poisonous alkaloids, emodin-bearing drugs, quinine or quinine-bearing drugs, bitter substances such as aloes, picrotoxin, cantharides, aspidium and the like.

I have found that as little as one tenth of one percent by weight of the toxic is often sufficient to prevent undesirable adhesion for long periods, of marine life to a surface coated with my composition and exposed to such life.

I attribute this to the peculiarly efficient distribution of the toxic throughout the composition and its peculiar availability at the surface thereof at all times for imbibing or suction by such life.

In addition to some or all of the above mentioned ingredients, I may add suitable pigments such as are well known and therefore need not be set forth in detail, for the purposes mentioned above, said pigments emulsifying with the remaining ingredients without difficulty, due largely to the presence of the cholesterin.

To dissolve the gum, the cholesterin and the fat, I prefer to use carbon tetrachloride as the solvent, and drip oil as a diluent, or either or both, using a sufficient amount to give the proper consistency. But I may omit the carbon tetrachloride altogether, or use it in connection with a great variety of other solvents such as carbon disulphide, chloroform, benzol and its homologues, illuminating gas-drip oil, aliphatic hydrocarbons and their derivatives, and aromatic hydrocarbons and their derivatives. Such solvents, when used as vehicles for the cholesterin, also assist in the emulsification of the composition.

I have found that the resulting composition can be applied to wet surfaces. The paint adheres firmly to any surface including metal, wood, stone and even to highly polished surfaces. It is firm and has elastic properties, and thereby gives under stress instead of being washed off the surface to which it is applied. It never dries hard in the sense that ordinary paints or varnishes dry, since a moisture content is retained therein, and it remains yielding and does not become brittle. Marine life does not permanently adhere thereto, probably because of the toxic or unpleasant effect of the extremely bitter principles of the gum. These principles, I believe, are distributed throughout the entire composition because of its homogeneous character and moisture retaining property. Sea animals which take in any of the moisture contained in my new coating composition either drop off the surface to which they try to secure themselves, or become so weakened that they are washed off or blown off by any gust of wind, or by ebb and flow of the tide, or are brushed off by friction. Ship bottoms, piles, cement or stone walls, and under-sea machinery, or construction using sea water for any purpose, such as condensing and cooling machinery, and sedimentation tanks which have been coated with my composition, remain free from sea growths and marine life for remarkably long periods.

My composition is further resistant to acid fumes such as those found in illuminating gas manufacturing plants, plants where chlorine is used, or where acrid fumes arise, and the like. It fully protects the surface to which it is applied over long periods, drying as a tough, somewhat yieldable elastic film, preventing rusting of steel or iron, and has many uses other than those above indicated.

It will be understood that materials other than those specified above such as additional resins, toxics, or gums may be added to my improved composition for various purposes, but I have found that since Lincman gum contains a colloid in the nature of rubber, and resembling chicle, together with resins and extremely bitter principles, and since cholesterin has the property of maintaining the composition elastic and aids in distributing the bitter principles throughout the composition, the gum, cholesterin and the vehicle for the cholesterin may, if desired, be combined by themselves to form an excellent composition for the purposes above described.

While I have described certain specific features of my new composition, I do not intend to limit myself to the specific ingredients or proportions set forth above, but intend to claim my invention as broadly as may be permitted by the state of the prior art and the terms of the appended claims.

I claim:

1. A coating composition comprising Lincman gum, cholesterin and a fat serving as a vehicle for the cholesterin.

2. A coating composition including Lincman gum and cholesterin.

3. An acid-fume resisting and anti-corrosive coating composition comprising Lincman gum, cholesterin, a fatty substance selected from a group consisting of animal, vegetable and mineral oils, fats and waxes, and a solvent.

4. A coating composition comprising Lincman gum, cholesterin, a fatty substance, and carbon tetrachloride as a non-inflammable solvent.

5. A composition suitable for use as a paint or cement in the presence of moisture including Lincman gum and a fatty substance, and cholesterin emulsifying the fatty substance.

6. A composition of matter including equal parts of a coagulated lactiferous colloidal exudate of a tropical plant, which has been named Lincman gum, cholesterin, and a fatty substance in which the cholesterin is soluble.

7. A composition of matter including Lincman gum, a fatty substance containing cholesterin, and a water-soluble toxic distributed throughout the composition by the cholesterin.

8. An anti-fouling paint which is elastic and to which marine plants and animals do not adhere, including Lincman gum, a fatty vehicle carrying cholesterin, a pigment emulsified by the cholesterin, and a solvent.

9. An anti-fouling paint which does not become brittle when dry but which remains yieldable and impervious to water friction, which repels marine life and adheres well to all types of surfaces and can be applied to wet surfaces comprising substantially twenty-five parts by weight of the lactiferous exudate of the *Euphorbia lactea*, five to ten parts of cholesterin carried by the same quantity of a fatty vehicle for the cholesterin, a water soluble toxic dissolved in water and a solvent.

10. A coating composition including substantially twenty-five parts by weight of the resinous lactiferous exudate of the *Euphorbia lactea*, five to ten parts of cholesterin carried by a fatty vehicle and less than 1% of a toxic.

JOHN MANO.